US011194068B1

(12) United States Patent
Nessim et al.

(10) Patent No.: US 11,194,068 B1
(45) Date of Patent: Dec. 7, 2021

(54) SYSTEMS AND METHODS FOR OBJECT LOCATION DETECTION SUCH AS DETECTING AIRPLANE CRASH LOCATION

(71) Applicants: Maurice Nessim, Houston, TX (US); Nicolae Moldoveanu, Nice (FR)

(72) Inventors: Maurice Nessim, Houston, TX (US); Nicolae Moldoveanu, Nice (FR)

(73) Assignee: Maurice Nessim, Houston, TX (US)

( * ) Notice: Subject to any disclaimer, the term of this patent is extended or adjusted under 35 U.S.C. 154(b) by 0 days.

(21) Appl. No.: 17/240,300

(22) Filed: Apr. 26, 2021

(51) Int. Cl.
*G01V 1/30* (2006.01)
*G01V 1/38* (2006.01)

(52) U.S. Cl.
CPC .............. *G01V 1/303* (2013.01); *G01V 1/307* (2013.01); *G01V 1/3808* (2013.01); *G01V 2210/32* (2013.01); *G01V 2210/34* (2013.01); *G01V 2210/6222* (2013.01)

(58) Field of Classification Search
CPC ...... G01V 1/303; G01V 1/307; G01V 1/3808; G01V 2210/32; G01V 2210/34; G01V 2210/6222; G05B 19/042; G06F 11/3051; G06N 20/00
See application file for complete search history.

(56) References Cited

U.S. PATENT DOCUMENTS

| | | | | |
|---|---|---|---|---|
| 7,640,083 B2 * | 12/2009 | Monroe | ............ | G08B 13/19663 701/9 |
| 9,745,071 B1 * | 8/2017 | Wang | ...................... | B64D 25/08 |
| 10,136,327 B1 * | 11/2018 | Fernandez | ........ | H04M 1/72454 |
| 10,859,698 B2 | 12/2020 | Moody et al. | | |
| 2020/0158899 A1 * | 5/2020 | Li | .......................... | G01V 1/008 |

FOREIGN PATENT DOCUMENTS

| | | |
|---|---|---|
| CN | 109327676 U | 7/2017 |
| CN | 110501742 | 8/2019 |
| FR | 2822549 B1 | 3/2001 |
| KR | 101232049 | 9/2010 |

OTHER PUBLICATIONS

Clemente et al., "Smart Seismic Sensing for Indoor Fall Detection, Location and Notification", IEEE J. of Biomed. and Health Informatics (Apr. 1, 2019), pp. 1-9.

* cited by examiner

*Primary Examiner* — Elias Desta
(74) *Attorney, Agent, or Firm* — Gregory L. Porter; Hunton Andrews Kurth LLP

(57) ABSTRACT

Systems and methods for determining object location may include a memory and a processor. The processor may be configured to collect seismic data and geophysical data to determine object location. The processor may be configured to determine one or more seismic attributes associated with a plurality types of noises based on the seismic data and the geophysical data using one or more machine learning algorithms. The processor may be configured to eliminate unwanted noises from noise classifications based on the one or more seismic attributes. The processor may be configured to predict the object location by comparing time and velocity data of the object with recorded timing and velocity data. The processor may be configured to validate the object location by comparing the determined noise with image data. The systems and methods may be used in, for example, detecting missing planes such as Malaysian Airlines Flight 370.

20 Claims, 10 Drawing Sheets

600

1000

SYSTEMS AND METHODS FOR OBJECT LOCATION DETECTION SUCH AS DETECTING AIRPLANE CRASH LOCATION

FIELD OF THE DISCLOSURE

The present disclosure relates to systems and methods for object location detection, and more particularly, for improving the prediction of object location.

BACKGROUND

Techniques for identifying the location of an object are often limited to knowing when to lodge an object, thereby effectively knowing where the object is located when it hits a surface. In addition, such techniques lack the ability for improving the prediction of object location.

These and other deficiencies exist.

SUMMARY OF THE DISCLOSURE

Embodiments of the present disclosure provide a location system. The location system may include a memory and a processor. The processor may be configured to collect seismic data and geophysical data to determine object location. The processor may be configured to determine one or more seismic attributes associated with a plurality types of noises based on the seismic data and the geophysical data using one or more machine learning algorithms. The processor may be configured to eliminate unwanted noises from noise classifications based on the one or more seismic attributes. The processor may be configured to predict the object location by comparing time and velocity data of the object with recorded timing and velocity data. The processor may be configured to validate the object location by comparing the determined noise with image data.

Embodiments of the present disclosure provide a method of determining object location. The method may include collecting, by a processor, seismic data and geophysical data to determine object location. The method may include determining, by the processor, one or more seismic attributes associated with a plurality types of noises based on the seismic data and the geophysical data using one or more machine learning algorithms. The method may include eliminating, by the processor, unwanted noises from noise classifications based on the one or more seismic attributes. The method may include predicting, by the processor, the object location by comparing time and velocity data of the object with recorded timing and velocity data. The method may include validating, by the processor, the object location by comparing the determined noise with image data.

Embodiments of the present disclosure provide a computer readable non-transitory medium comprising computer executable instructions that, when executed on a processor, perform procedures comprising the steps of: collecting seismic data and geophysical data to determine object location; determining one or more seismic attributes associated with a plurality types of noises based on the seismic data and the geophysical data using one or more machine learning algorithms; eliminating unwanted noises from noise classifications based on the one or more seismic attributes; predicting the object location by comparing time and velocity data of the object with recorded timing and velocity data; and validating the object location by comparing the determined noise with image data.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein identify the location of an object that has crashed into a body of water using seismic data. Without limitation, the systems and methods are applicable to identifying the location of a plane that has crashed into the sea or ocean using seismic data. Examples of other applications that are within the scope of the invention include identifying the location of any object that has fallen from the sky into the water, exploration, environmental analysis, and the like. In addition, the invention is not limited to objects approaching or falling into the water. For example, the systems and methods disclosed herein may be applied to objects approaching or falling into the earth, and not just water. Seismic data may be collected from vessels that operate in the assumed body of water, such as the sea or ocean. This collected data is recorded prior to the assumed time of the crash, during the crash, and after the crash up to a predetermined number associated with time. For example, the predetermined number may include any number of seconds, minutes, hours, days, weeks, months, etc. In some example, the collected data may be recorded prior to and after the crash up to a minimum of fifty hours.

Figure 6:
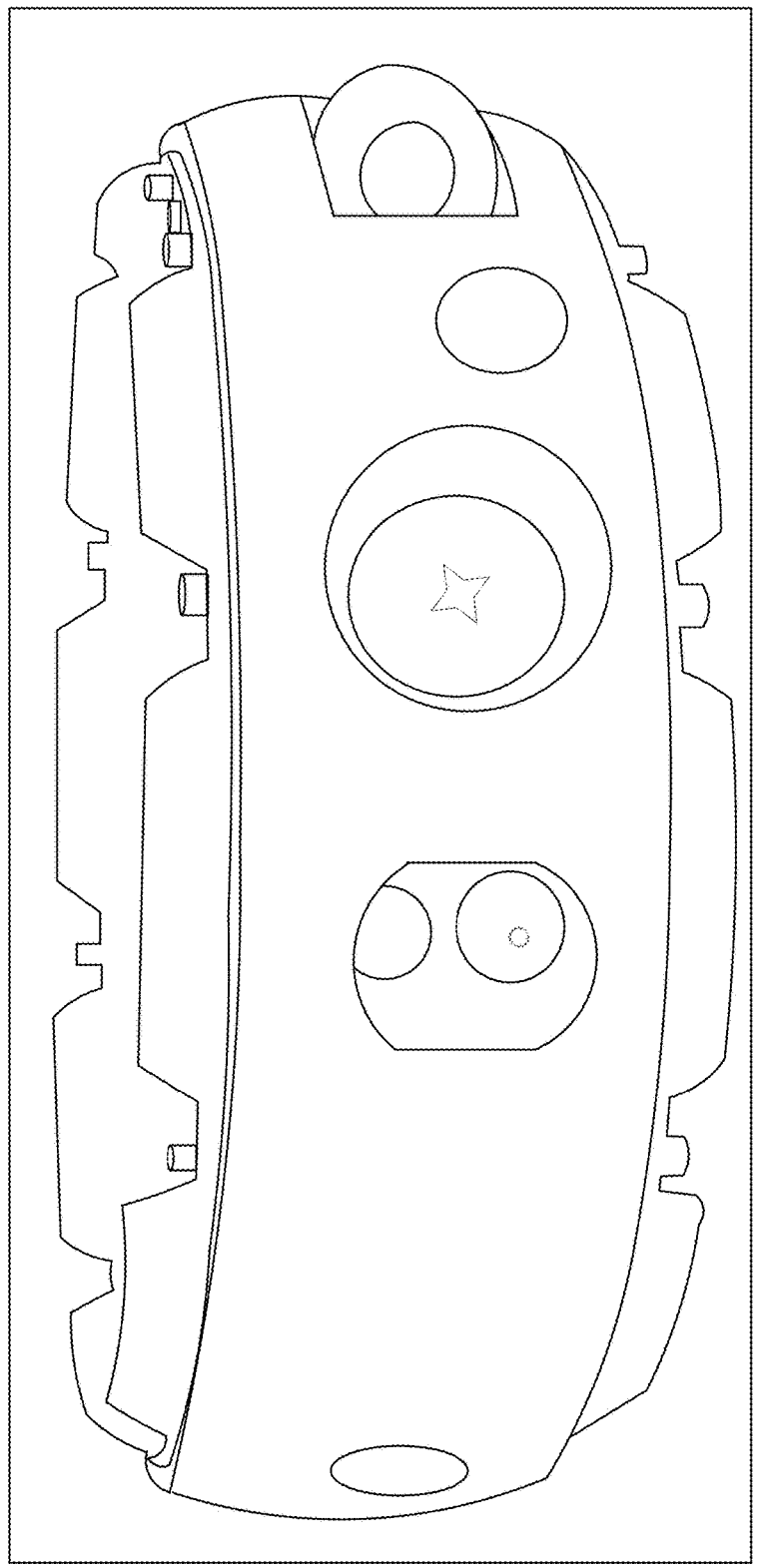
FIG. 6 depicts a node device according to an exemplary embodiment.

There are two distinct situations that must be considered. In the first situation, consideration must be given to the location of the crash within a seismic survey area. In this case, and with reference to FIG. 7, a direct wave and a refracted wave may be recorded by the receivers in the streamer, and with reference to FIG. 8, a direct wave and a refracted wave may be recorded by one or more ocean bottom node (OBN) devices. An example of OBN device is illustrated in FIG. 6. For streamers and OBN, the distances SRi (i=receiver index) from pseudo-source location S to receivers Ri must be estimated. In some examples, different formulas may be used to estimate these distances based on direct waves or refracted waves, and this is part of the specific processing for the streamer and OBN; to obtain accurate estimation of SRi, accurate water velocity variation with depth is required. In the second situation, consideration must also be given to the location of the crash at a large distance from the survey area.

Figure 9:
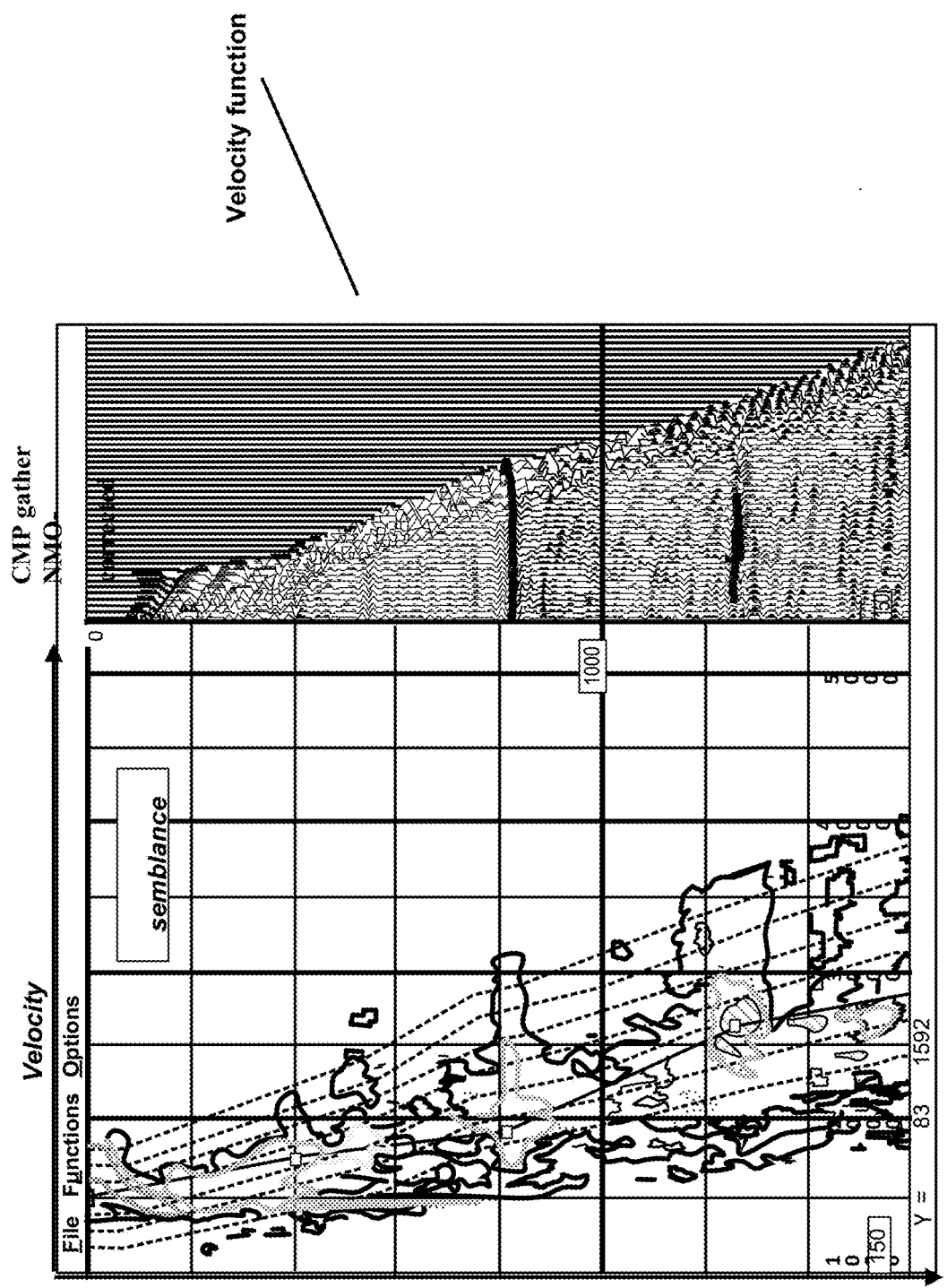
FIG. 9 depicts a graph according to an exemplary embodiment.

If a deep sound channel, such as a sound fixing and ranging (SOFAR) channel, is present in the survey area this facilitates transmission of the sound generated by the plane crash over very large distances, which will increase the likelihood of recording the sound from the plane crash. Water velocity analysis is required to be performed on the collected seismic data to determine water velocity variation with depth, and to determine if there is a layer of low velocity in the water (SOFAR channel). If the presence of this layer is detected, it must be evaluated how this is coupled to the streamer spread or OBN grid of receivers. An example of water velocity analysis is illustrated in FIG. 9. This is based on measuring the semblance on common midpoint (CMP) gathers that normal moveout (NMO) corrected with different velocities. Other methods may be used to estimate velocity in water or sediments, including but not limited to full wavefield inversion (FWI) and tomography.

If there is a plane present on or near the bottom of the ocean, then any reflection coming from it will be showing a rather large anomaly. Moreover, this reflected signal will likely not indicate sand or mud and will rather exhibit certain characteristics. In some examples, if a seismic survey was recorded over an area where a plane crashed, and the plane did not disintegrate in very small fragments, the recorded signal may appear as seismic diffractions, because the acoustic impedance contrast between plane (metal) and earth sediments is very high.

Object location may be accurately approximated and thereby improved by transmitting the signals received from different surveys from a vessels and hydrophones and based on the difference in acoustic impedance including the velocity and density of the water. Depending on the angle of the object, such as the plane, with the surface of the water as part of the crash, a new sound will be produced. In this manner, the source of energy is the object, or plane, itself when it makes contact with the surface of the water. When any vessel nearby in the vicinity is nearby or otherwise records this new sound, a corresponding wave plane-let in the seismic data will be picked up through any number of surveys by one or more nodes or streamers, which may then be transmitted for analysis, as further described below.

If the vessels are located in vicinity of the new sound, this data is likely to be picked up by them. In some examples, one or more hydrophones that are located offshore or onshore may be configured to record this data. In some examples, standard hydrophones in the streamers may be used. For example, if the seismic survey is an ocean bottom node (OBN) survey, any and all four component (4C) receivers may be used. The 4C receivers may comprise a hydrophone, a vertical geophone, a horizontal geophone oriented in X direction, and a horizontal geophone oriented in Y-direction, as further depicted in FIG. 6, and the node device may be deployed on, without limitation, the ocean or sea floor. Moreover, a spike in the data measurement obtained by the vessels may represent a type of noise, and instruments or vessels that capture this information may be configured to eliminate the spike, for example, by identifying it as an electronic glitch during recording. In other examples, a processor of a first device may be configured to take the recorded data and remove this type of information as part of improving the signal to noise ratio. In some examples, these vessels may each be equipped with global positioning systems. These vessels may be periodically or continuously recording seismic data, and may even be for a different purpose, such as for exploration. Thus, if these vessels are recording and retain the original data, they necessarily include the noise spike captured as well. In some examples, the signal may be associated with the falling object if it has a unique shape or wave plane-let that may be identified on several recording channels for a short period of time, and if a similar type of wave plane-let is identified on the seismic records of the other surveys from one or more recording vessels. The wave plane-let may be a spike if the location of the crash was very close to the seismic recording system. However, as the two recording vessels corresponding to two different surveys are separated in space by a minimum distance of 20 km or more, the shape of the wave plane-let may be different due to attenuation of the high frequencies during propagation. From this captured seismic data, if a plurality of locations, such as two locations, from the vessels are obtained in which the wave plane-let from the data may be observed, the location including day and time may be accurately approximated. Thus, by isolating the initial signal wave plane-let that is received, other data is eliminated.

In some examples, if a plane crashes into shallow water, and the invention is implemented using the systems and methods disclosed herein, the likelihood of approximating an accurate location of the position of the object is increased due to the low level of the water. However, this implementation may be used as a point of calibration to approximate, or otherwise serve as a baseline, for identifying the location of objects that fall into similar water depths, or even deeper water depths. In this manner, if there is a future crash or similar problem of identifying the location of the object that falls from the sky into water, the invention may be trained by machine learning algorithms to automate the process described herein to accurately identify the location of the object. In an embodiment, the machine learning algorithms employed can include at least one selected from the group of gradient boosting machine, logistic regression, neural networks, and a combination thereof, however, it is understood that other machine learning algorithms can be utilized. Thus, the calibration through the case of the shallow water example may be used to demonstrate the validity of the invention. In some examples, if the crash happens in deep water and the location of the crash was identified on the recorded seismic data, that seismic data may also be used by a processor as training data for the machine learning algorithms for future applications.

In other applications, devices associated with agencies such as NASA® may be periodically or monitoring objects or masses falling from the sky that, for example, make contact with the surface of earth or water. The invention may work in tandem with such agencies. For example, the systems and methods disclosed herein may complement this type of work, in which the processor is configured to compare the seismic data with one or more images that are captured and received in order to improve the accuracy of the location of the object. The captured image may comprise a single image or a plurality of images of the falling object approaching the earth or water. In this manner, data validation may be performed by the processor to improve the detection of the location of the object.

Other types of measurements than may be used in combination with seismic data are recorded by fiber optic cables that are deployed on the ocean floor for internet and telephone communications. Over 1,200,000 km of fiber optics cable are already deployed across the oceans. The transoceanic fiber optic cables may be further configured to detect changes in polarization of the light traveling through the cables that are caused by perturbations in the water produced by large waves related to large storms or earthquakes generated under water. The fiber optic cables, such as distributive acoustic sensors (DAS cable), may be further configured to acquire borehole and surface seismic data for seismic applications.

Figure 1:
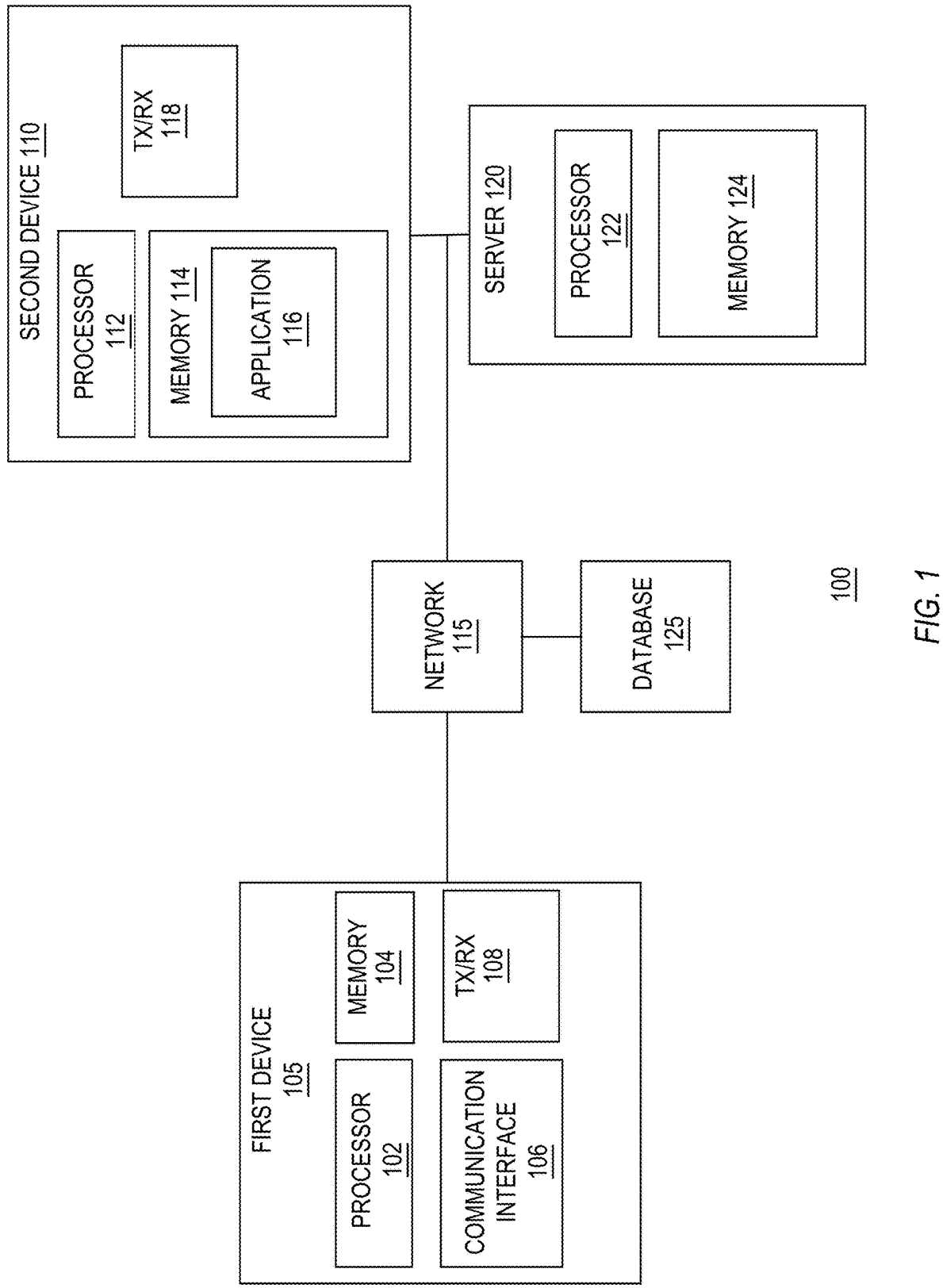
FIG. 1 depicts a location system according to an exemplary embodiment.

FIG. 1 illustrates a location system 100 according to an exemplary embodiment. The system 100 may comprise a first device 105, a second device 110, a network 115, a server 120, and a database 125. Although FIG. 1 illustrates single instances of components of system 100, system 100 may include any number of components.

System 100 may include a first device 105. The first device 105 may include one or more processors 102, and memory 104. The first device 105 may comprise a network-enabled computer, or other device described herein. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a kiosk, a tablet, a terminal, or other device. First device 105 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Without limitation, the first device 105 may comprise an acquisition device configured to perform object location detection using the systems and methods disclosed herein.

The first device 105 may include processing circuitry and may contain additional components, including processors, memories, error and parity/CRC checkers, data encoders, anticollision algorithms, controllers, command decoders, security primitives and tamperproofing hardware, as necessary to perform the functions described herein. The first device 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

First device 105 may include a communication interface 106. The communication interface 106 may comprise communication capabilities with physical interfaces and contactless interfaces. In some examples, the communication interface 106 may be configured to establish contactless communication via a short-range wireless communication method, such as NFC, Bluetooth, Wi-Fi, RFID, and other forms of contactless communication. As shown in FIG. 1, the communication interface 106 may be configured to communicate directly with the second device 110, server 120, and/or database 125 via network 115.

First device 105 may be in data communication with any number of components of system 100. For example, first device 105 may transmit and/or receive data via network 115 to and/or from second device 110, and/or server 120. First device 105 may transmit data via network 115 to database 125.

First device 105 may be include any number of transmitters and/or receivers 108 that are configured to communicate with any component of system 100. The transmitter and/or receiver 108 may be configured to transmit and receive any type of data. For example, the transmitter and/or receiver 108 may be configured to transmit and/or receive seismic and geological data from second device 110.

System 100 may include a second device 110. The second device 110 may be associated with any type and number of hydrophones or vessels that are configured to record and capture data, including but not limited to seismic data. The second device 110 may include one or more processors 112, and memory 114. Memory 114 may include one or more applications, including but not limited to application 116. Second device 110 may be in data communication with any number of components of system 100. For example, second device 110 may transmit and/or receive data via network 115 to and/or from first device 105 and/or server 120. Second device 110 may transmit data via network 115 to database 125. Without limitation, second device 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, a kiosk, a tablet, a terminal, or other device. Second device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

Second device 110 may be include any number of transmitters and/or receivers 118 that are configured to communicate with any component of system 100. The transmitter and/or receiver 118 may be configured to transmit and receive any type of data. For example, the transmitter and/or receiver 118 may be configured to transmit and/or receive seismic and geological data to and/or from first device 105.

System 100 may include a network 115. In some examples, network 115 may be one or more of a wireless network, a wired network or any combination of wireless network and wired network, and may be configured to connect to any one of components of system 100. For example, first device 105 may be configured to connect to server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors 122 coupled to memory 124. Server 120 may be configured as a central system, server or platform to control and call various data at different times to execute a plurality of workflow actions. Server 120 may be configured to connect to any component of first device 105 and/or second device 110. Server 120 may be in data communication with the processor 102 and/or application 116. For example, a server 120 may be in data communication with any of transmitter and/or receiver 108, 118 via one or more networks 115. First device 105 may be in communication with one or more servers 120 via one or more networks 115 and may operate as a respective front-end to back-end pair with server 120. First device 105 may transmit, for example from processor 102, one or more requests to server 120. The one or more requests may be associated with retrieving data from second device 110 and/or server 120. Server 120 may receive the one or more requests from first device 105. Based on the one or more requests from processor 102, server 120 may be configured to retrieve the requested data. Server 120 may be configured to transmit the received data to processor 106, the received data being responsive to one or more requests.

In some examples, server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 may include an application comprising instructions for execution thereon. For example, the application may comprise instructions for execution on the server 120. The application of the server 120 may be in communication with any components of system 100. For example, server 120 may execute one or more applications that enable, for example, network and/or data communications with one or more components of system 100 and transmit and/or receive data. Without limitation, server 120 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by processor 102. Server 120 may be configured to transmit the received data from database 125 to processor 102 via network 115, the received data being responsive to the transmitted one or more requests. In other examples, processor 102 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, second device 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The processor 102 may be configured to perform analysis of the seismic data to identify and classify the type of noise affecting the seismic data. The deeper the crash into the water, the greater the likelihood of salinity. For example, if the salinity of the water increases, the absorption is stronger and higher frequencies will be more attenuated than lower frequencies. Another critical factor related to sound attenuation is the propagation distance of the sound in water. In some examples, the processor 102 may be configured to perform the analysis on raw seismic data and after attenuation of marine noise. In some examples, the processor 102 may be configured to determine anomalous noise. In other examples, the processor 102 may be configured to determine one or more non-geological signals. The noise may be coherent, such as that exhibiting a constant characteristic, or random, such as that not exhibiting a specific characteristic. Other noises may include electrical noises, surface noises, and/or environmental noises. In some examples, any data related to the surface or earth are eliminated and noises are kept, including specific types of noises. In this manner, the amplitude over a small time interval may be measured, thereby corresponding to the spike, as previously mentioned, which may be recognized as a training period for the machine learning algorithm which may further be configured to identify anomalous signals or noise, and upon such identification, determine if the recorded signal corresponds to a type of wave, such as a direct wave or a refracted wave. This technique may be reiterated for large volumes of data using the machine learning algorithm.

Figure 10:
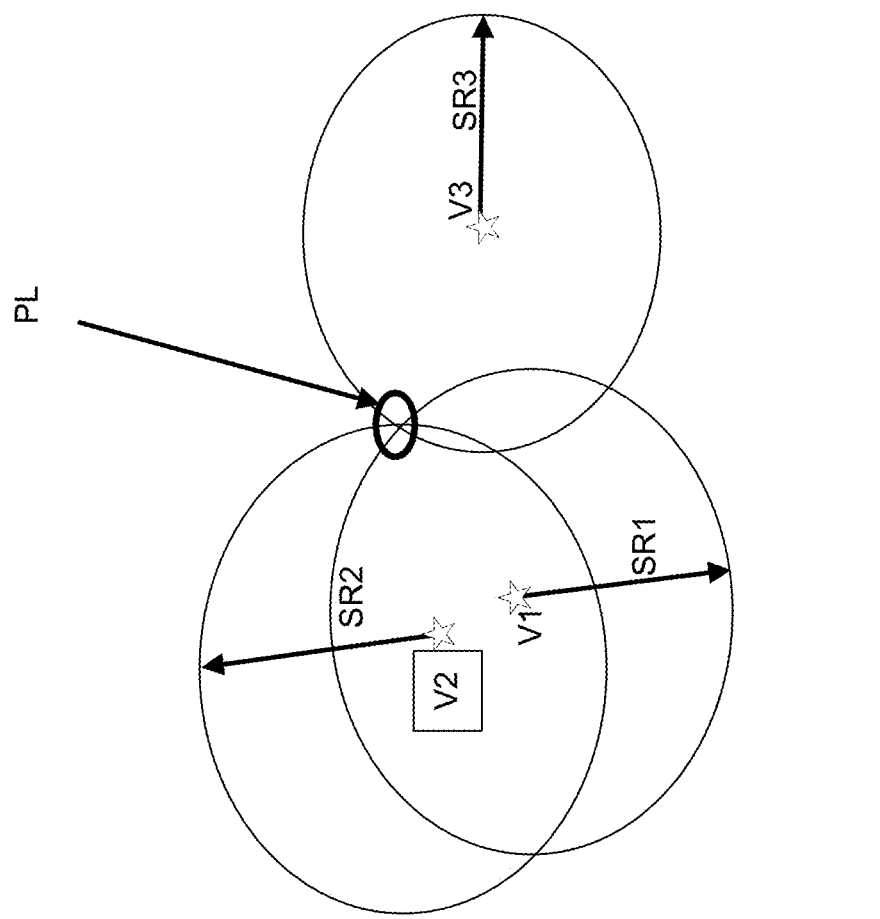
FIG. 10 depicts a method of object location according to an exemplary embodiment.

The processor 102 may be configured to identify and classify the type of noise using one or more machine learning algorithms. For example, the machine learning algorithm may be trained to improve the accuracy and efficiency of the object location determination. For example, the machine learning algorithm may be trained to recognize that when seismic data is being captured, a predetermined number of streamers are needed to capture this data, such as a vessel pulling a spread of 10 streamers, each with a given length of about 8-14 km long and a width of the spread of 800 m to 1400 m. In some examples, the machine learning algorithm may be further trained to recognize that any streamer may be moving and pulling any number and type of hydrophones behind them that are suspended above and below the surface of the power. The machine learning algorithm may be further trained to recognize that each vessel has a given number of sensors. In a single experiment or shot, for example, millions of data recordings may be captured, and the machine learning algorithm may be trained to look at only a portion, such as a five, of these data recordings in order to identify the characteristics resembling that of the spike based on the high amplitude over the short period of time interval, including the identification of the anomalous signals or noise, and also the type of wave. In addition, the machine learning algorithm may be trained to further recognize that any signal arriving from a greater depth than desired is to be eliminated from consideration. The processor 102 may be configured to load the seismic data volume into and thereby communicate with an interpretation engine. For example, the interpretation engine may include a three-dimensional visualization and interpretation algorithm, such as Petrel®. In some examples, the interpretation engine may be internal to the first device. In other examples, the interpretation may be external to the first device. The interpretation engine may be configured to examine the seismic data in common shot gathers, common trace gathers, and three-dimensional stacked volumes to generate a plurality of types of seismic attributes. The plurality of types of seismic attributes may be used to identify the anomalous noise or non-geological signals, such as the spike as previously mentioned above. In other examples, the processor 102, instead of the interpretation engine, may be configured to perform the examination of the seismic data. The processor 102 may be configured to determine if the anomalous noise or non-geological signal is consistent on different measurements from one or more surveys. If the processor 102 determines that the anomalous noise or non-geological signal is consistent with different measurements retrieved from the surveys, then a disposition of "YES" is made with respect to whether the signal is in fact coming from the plane crash. If the processor 102 determines that the anomalous noise or non-geological signal is inconsistent with different measurements retrieved from the surveys, then a disposition of "NO" is made with respect to whether the signal is in fact coming from the plane crash. In this manner, the processor 102 may be configured to perform data validation on the seismic data. In some examples, the entire seismic data may be examined by a processor 102 or an interpretation system that may be configured to perform data validation based on 2D and 3D seismic displays including vertical and horizontal sections (time slices) to confirm the findings obtained from the machine learning algorithm examination, and in particular, the similarities in the shape of the signal of wave plane-let on different streamers, the accuracy of the timing as a function of distance from the recording vessel (the streamer and channel location) to the location of the crash, and the change in the shape of the wave plane-let as a function of distance from the recording vessel to the found location of the crash. The processor 102 may be configured to determine a location of the plane crash using a method based on triangulation. In particular, the processor 102 may be configured to take into account a plurality of receivers for streamer acquisition and a plurality of sensors for surveys, such as ocean bottom system surveys. In some examples, the triangulation method utilized herein may be used to identify the epicenters of the earthquakes using measurements from a plurality of stations, such as three seismic stations as illustrated in FIG. 10. Based on the estimated source-receiver distances, SRi, circles with radii SRi corresponding to a minimum of three receivers may be drawn and their intersection may provide the potential location of the plane crash. In some examples, an analysis, such as an uncertainty analysis, may be performed by the processor 102 for the estimated location of the crash. A plurality of factors that may be considered for performing the uncertainty analysis include: water velocity and sea floor velocities; and different receiver location along the streamers or different receiver location from the OBN survey. For each of these factors, different plausible values may be tested to determine the effect on the intersection point (potential location of the crash). This uncertainty analysis may be implemented with a machine learning algorithm. The processor 102 may be further configured to perform analysis on different possible velocities of the water, as well as identify timing.

Figure 2:
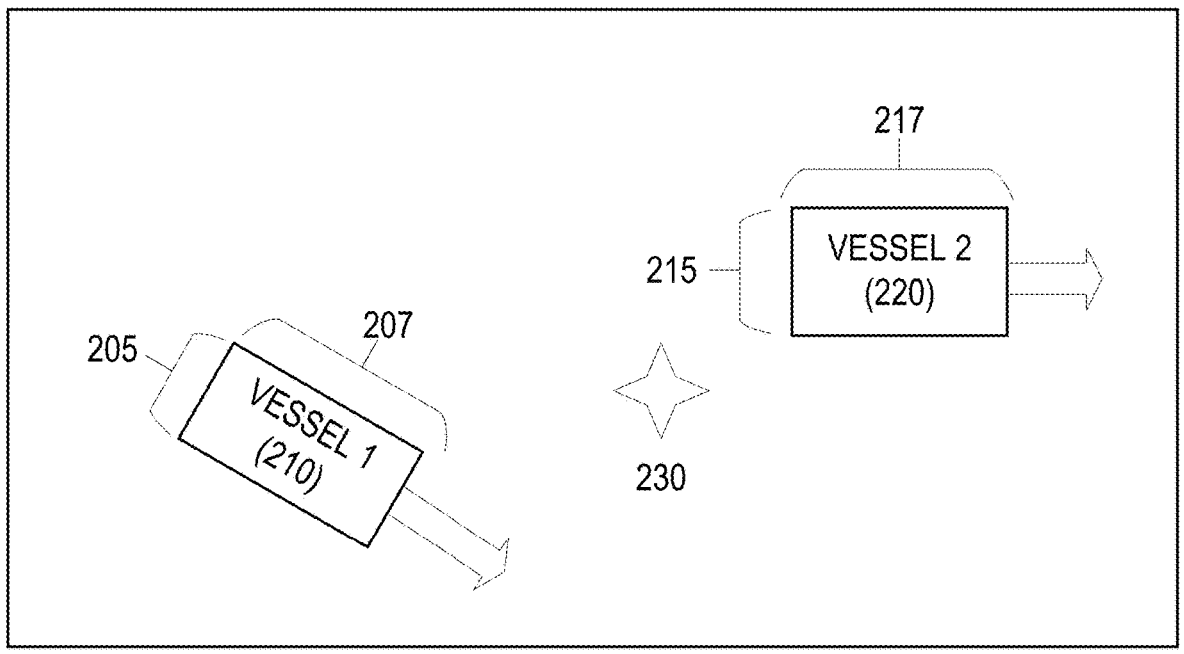
FIG. 2 depicts a location system according to an exemplary embodiment.

As illustrated in FIG. 2, a plurality of vessels of system 200 are depicted according to an exemplary embodiment. FIG. 2 may reference the same or similar components of system 100. Although FIG. 2 illustrates single instances of components of system 200, system 200 may include any number of components. In some examples, a minimum of two towed streamer seismic surveys may be conducted by the vessels 210, 220 during the plane crash. In some examples, the first vessel 210 may comprise a first dimension 205, which may include a width approximately ranging from 800 m to 1400 m. The first vessel 210 may comprise a second dimension 207, which may include a length approximately ranging from 8000 m to 14000 m. Thus, the second dimension 207 may exceed the first dimension 205 by, for example a factor of 10, however it is not limited to such configurations or dimensions. The second vessel 220 may comprise a first dimension 215, which may include a width approximately ranging from 800 m to 1400 m. The second vessel 220 may comprise a second dimension 217, which may include a length approximately ranging from 8000 m to 14000 m. Thus, the second dimension 217 may exceed the first dimension 215 by, for example a factor of 10, however it is not limited to such configurations or dimensions. Further, the vessels 210, 220 may be each disposed in different directions. Without limitation, vessel 210 may be in transit in a southeast direction during the time of the plane crash at point 230, whereas vessel 220 may be in transit in an east direction during the time of the plane crash at point 230. It is understood that vessel 210 may be the same or different as vessel 220. As previously explained, a processor, such as processor 102 of the first device 105, may be configured to receive the surveys from each of the vessels 210, 220 via second device 110. In some examples, the data received from each survey should include data with navigation information in the headers. For example, the data with navigation information in the headers may be provided with no additional processing. In some examples, the required processing may be the same for each data set on the designated device. Specific formulas for streamers and OBN may be used in processing to calculate the distances from the assumed source location to that of the specific receivers.

Figure 3:
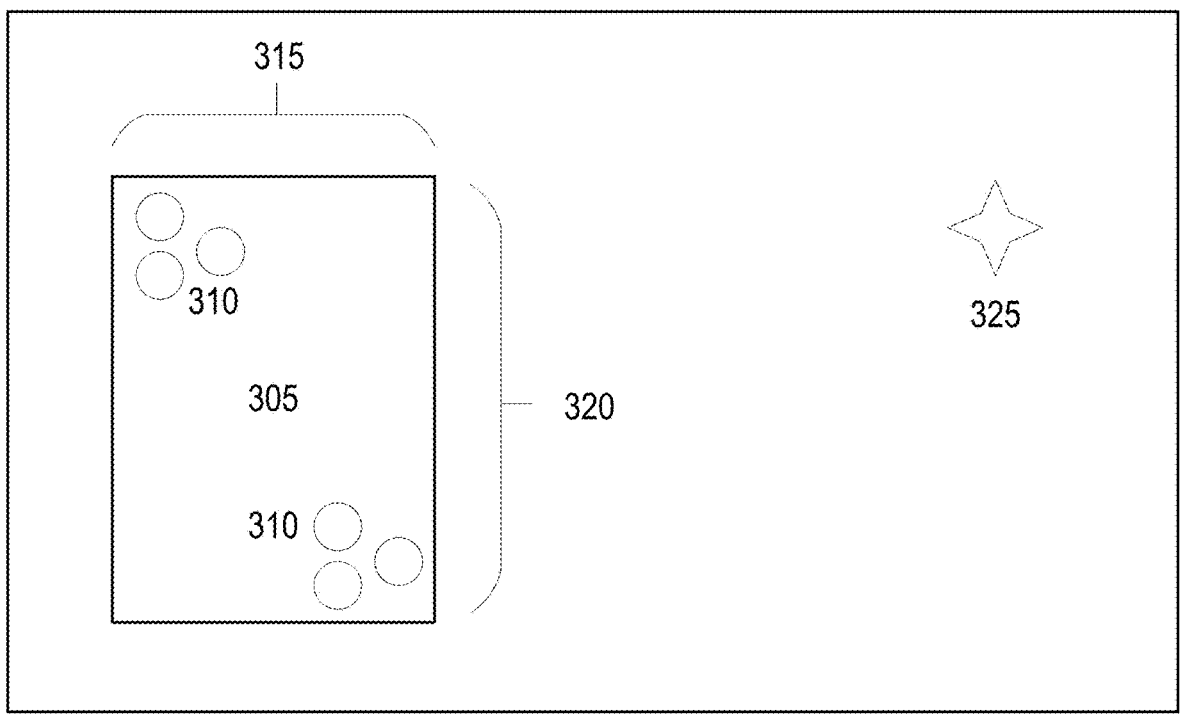
FIG. 3 depicts a location system according to an exemplary embodiment.

As illustrated in FIG. 3, a survey may be conducted during the plane crash by system 300 according to an exemplary embodiment. FIG. 3 may reference the same or similar components of system 100, and system 200 of FIG. 2. Although FIG. 3 illustrates single instances of components of system 300, system 300 may include any number of components. For example, an ocean bottom node 305 survey may be conducted during the plane crash at point 325. In some examples, the distance between the plurality of sensors 310 disposed on the sea floor may range from 200 m to 1000 m. The ocean bottom node 305 may include any number of receivers for capturing data and transmitters for transmitting this data to the processor, such as processor 102 of first device 105.

Figure 4:
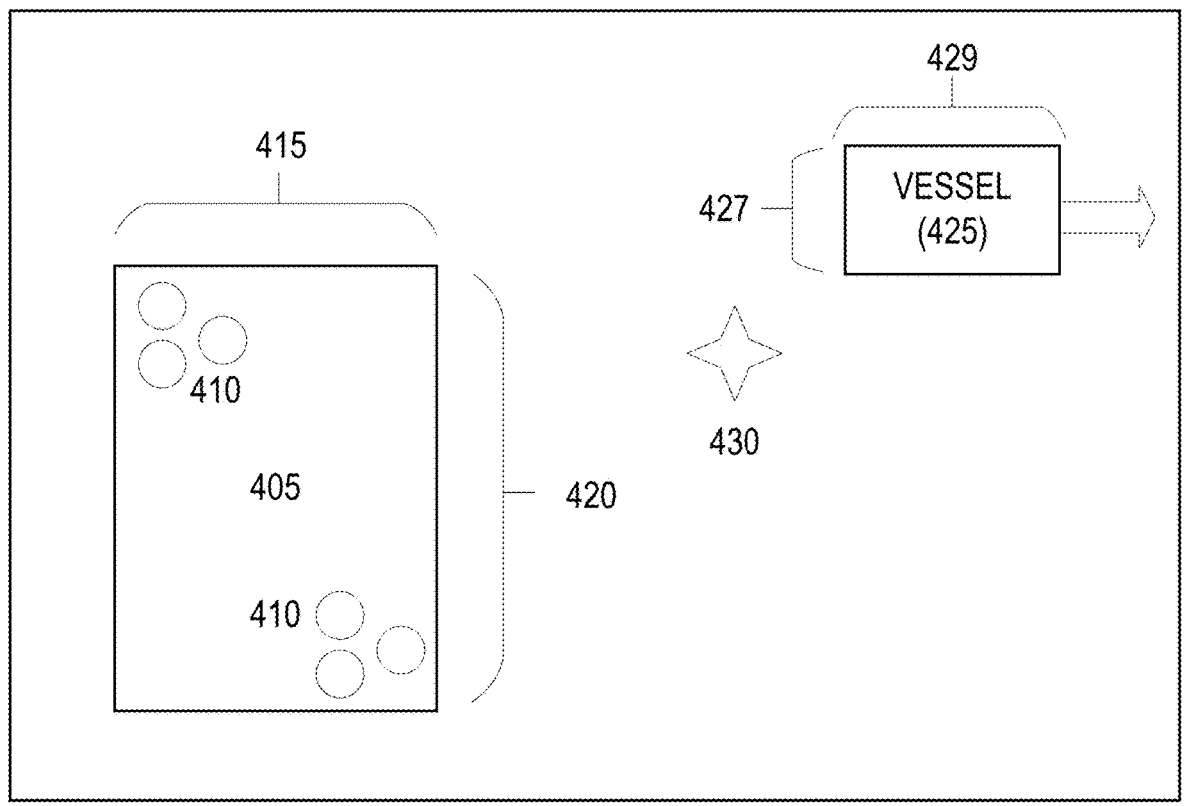
FIG. 4 depicts s a location system according to an exemplary embodiment.

In some examples, the survey may take into account a region including a first dimension 315 and a second dimension 320. Without limitation, the first dimension 315 may comprise a width of 20-40 km. Without limitation, the second dimension 320 may comprise a length of 40-60 km. Thus, the second dimension 320 may exceed the first dimension 315 by, for example a factor of 2, however it is not limited to such configurations or dimensions. It is understood that additional surveys from the ocean bottom node 305 may be conducted. As previously explained, a processor, such as processor 102 of the first device 105, may be configured to receive this survey from the ocean bottom node 305 via second device 110. In some examples, OBN devices may be deployed to a maximum depth, such as 3000 m. Moreover, the processing and analysis of OBN data may be similar to that as implemented with the streamer data As illustrated in FIG. 4, a plurality of surveys may be conducted during the plane crash by system 400 according to an exemplary embodiment. FIG. 4 may reference the same or similar components of system 100, system 200 of FIG. 2, and system 300 of FIG. 3. Although FIG. 4 illustrates single instances of components of system 400, system 400 may include any number of components. For example, an ocean bottom node 405 survey and a towed streamer survey from a first vessel 425 may be conducted during the plane crash at point 430. In some examples, the survey from the ocean bottom node 405 may take into account a region including a first dimension 415 and a second dimension 420. Without limitation, the first dimension 415 may comprise a width of 20-40 km. Without limitation, the second dimension 420 may comprise a length of 40-60 km. Thus, the second dimension 420 may exceed the first dimension 415 by, for example a factor of 2, however it is not limited to such configurations or dimensions. It is understood that additional surveys from the ocean bottom node 405 may be conducted. In some examples, the distance between the plurality of sensors 410 disposed on the sea floor may range from 200 m to 1000 m. In some examples, the first vessel 425 may comprise a first dimension 427, which may include a width approximately ranging from 800 m to 1400 m. The first vessel 425 may comprise a second dimension 429, which may include a length approximately ranging from 8000 m to 14000 m. Thus, the second dimension 429 may exceed the first dimension 427, for example by a factor of 10, however it is not limited to such configurations or dimensions. It is understood that additional surveys from the first vessel 425 may be conducted. Without limitation, vessel 425 may be in transit in an east direction during the time of the plane crash at point 430. As previously explained, a processor, such as processor 102 of the first device 105, may be configured to receive each of these surveys from one or more second devices 110. From each survey, the critical results from each of these surveys may include: the receiver locations Ri where the source arrival was detected; calculated distances SRi based on formula for direct waves and refracted waves; and water velocities profiles that describe variation of water velocity with depth.

Figure 5:
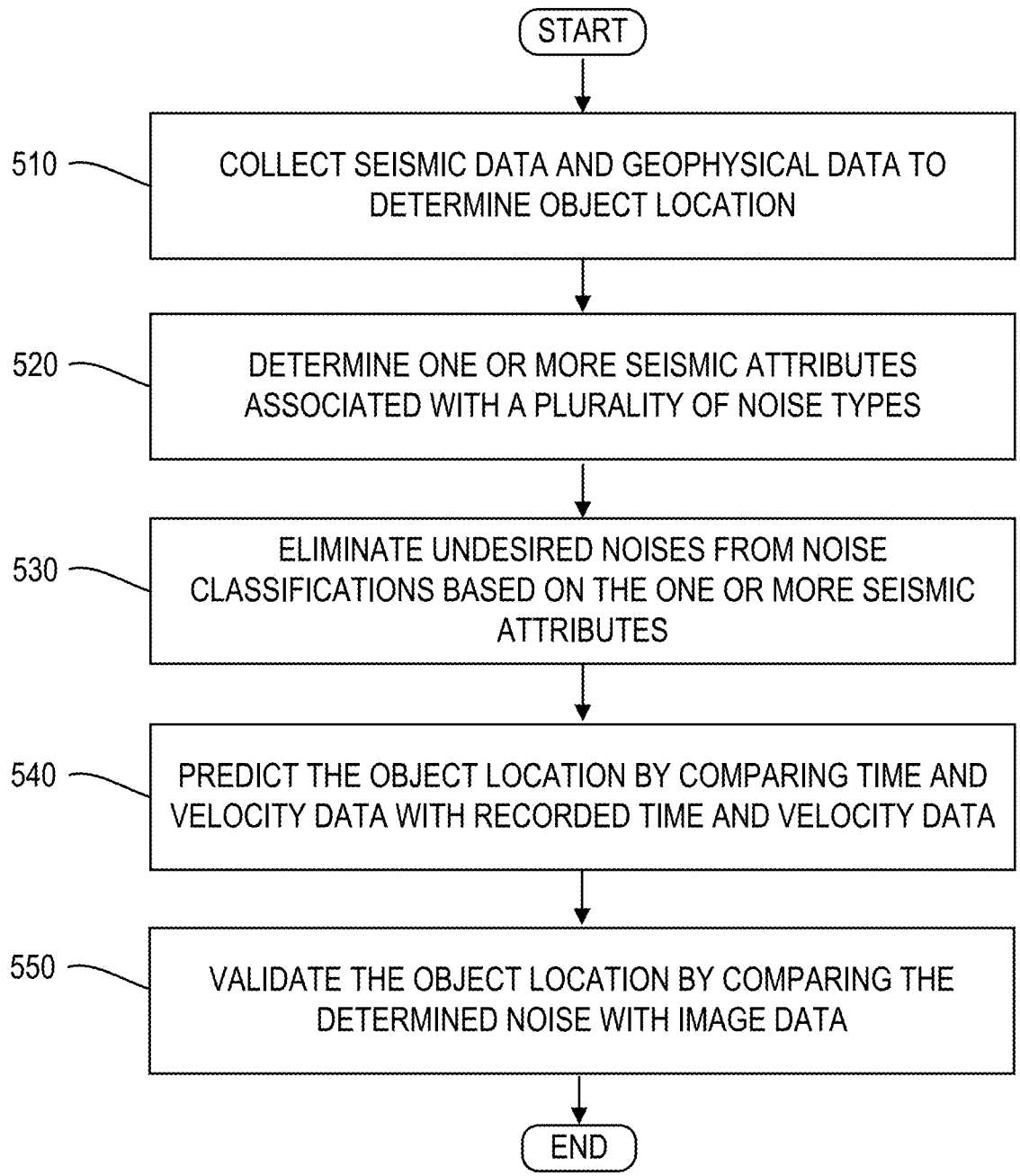
FIG. 5 depicts a method of determining object location according to an exemplary embodiment.

FIG. 5 depicts a method of 500 of determining object location according to an exemplary embodiment. FIG. 5 may reference the same or similar components of system 100, system 200 of FIG. 2, system 300 of FIG. 3, and system 400 of FIG. 4.

At block 510, the method 500 may include collecting, by a processor, seismic data and geophysical data to determine object location. As previously explained above, the processor may belong to a device, such as first device 105.

At block 520, the method 500 may include determining, by the processor, one or more seismic attributes associated with a plurality types of noises based on the seismic data and the geophysical data using one or more machine learning algorithms.

At block 530, the method 500 may include eliminating, by the processor, unwanted noises from noise classifications based on the one or more seismic attributes.

At block 540, the method 500 may include predicting, by the processor, the object location by comparing time and velocity data of the object with recorded timing and velocity data.

At block 550, the method 500 may include validating, by the processor, the object location by comparing the determined noise with image data.

FIG. 6 depicts a node device 600 according to an exemplary embodiment. FIG. 6 may reference the same or similar components of system 100, system 200 of FIG. 2, system 300 of FIG. 3, system 400 of FIG. 4, and method of FIG. 5. The node device 600 may comprise an ocean bottom node device. As further depicted in FIG. 6, the type of sensors for OBN surveys are 4C (4 component): a hydrophone, a vertical geophone, a horizontal geophone oriented in X direction, and a horizontal geophone oriented in Y-direction, and node device 600 may be deployed on, without limitation, the ocean or sea floor. In some examples, the deployment of the receivers may be on a grid, with a grid interval that may vary from 400 m×400 m to 1100 m×1100 m. In some examples, and without limitation, the number of nodes 600 that may be deployed with the systems and methods of the present disclosure may range from 2000 to 4000 nodes. For example, if the seismic survey is an ocean bottom node (OBN) survey, any and all four component (4C) receivers may be used.

Figure 7:
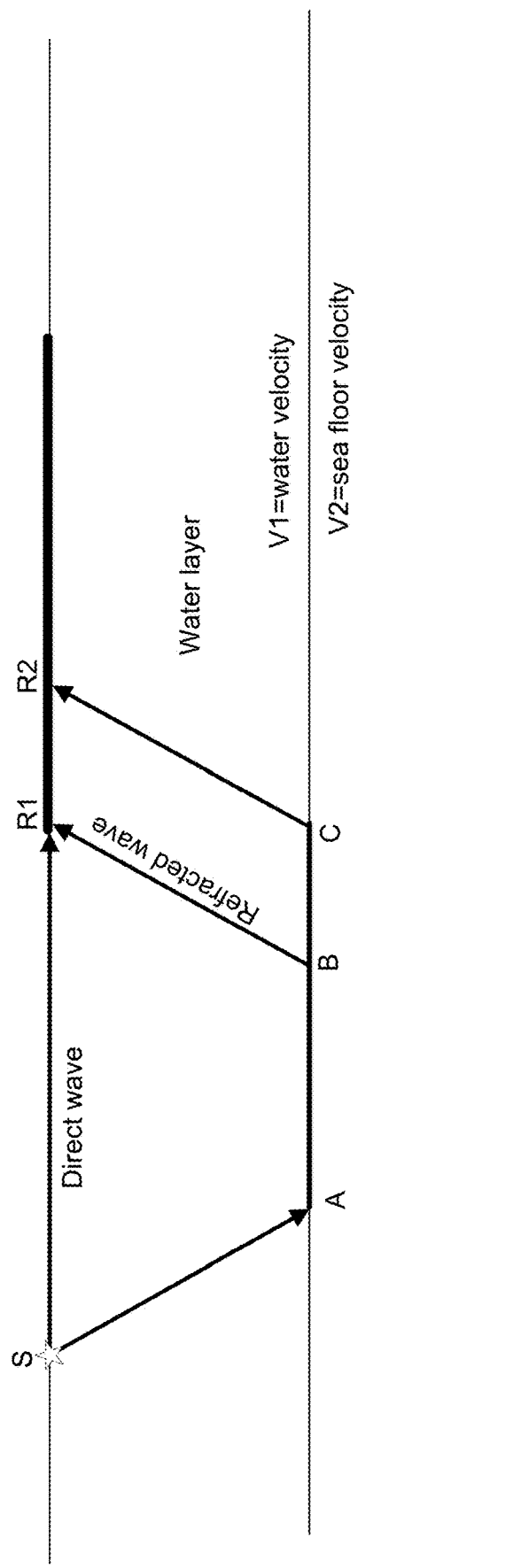
FIG. 7 depicts an illustration of data recording according to an exemplary embodiment.

FIG. 7 depicts an illustration of data recording 700 according to an exemplary embodiment. FIG. 7 may reference the same or similar components of system 100, system 200 of FIG. 2, system 300 of FIG. 3, system 400 of FIG. 4, method of FIG. 5, and device 600 of FIG. 6. As illustrated in FIG. 7, waves may be recorded by receivers in the streamers. For example, direct waves and refracted waves may be recorded by the streamer receivers if the location of the object crash is within the seismic survey area. As denoted in FIG. 7, S represents the assumed location of the source. For streamers, the distances SRi (i representing the receiver index) from pseudo-source location S to receivers Ri, such as R1 and R2, must be calculated. Sea floor velocity V2 must be greater than water velocity V1 for generation of a refracted event.

Figure 8:
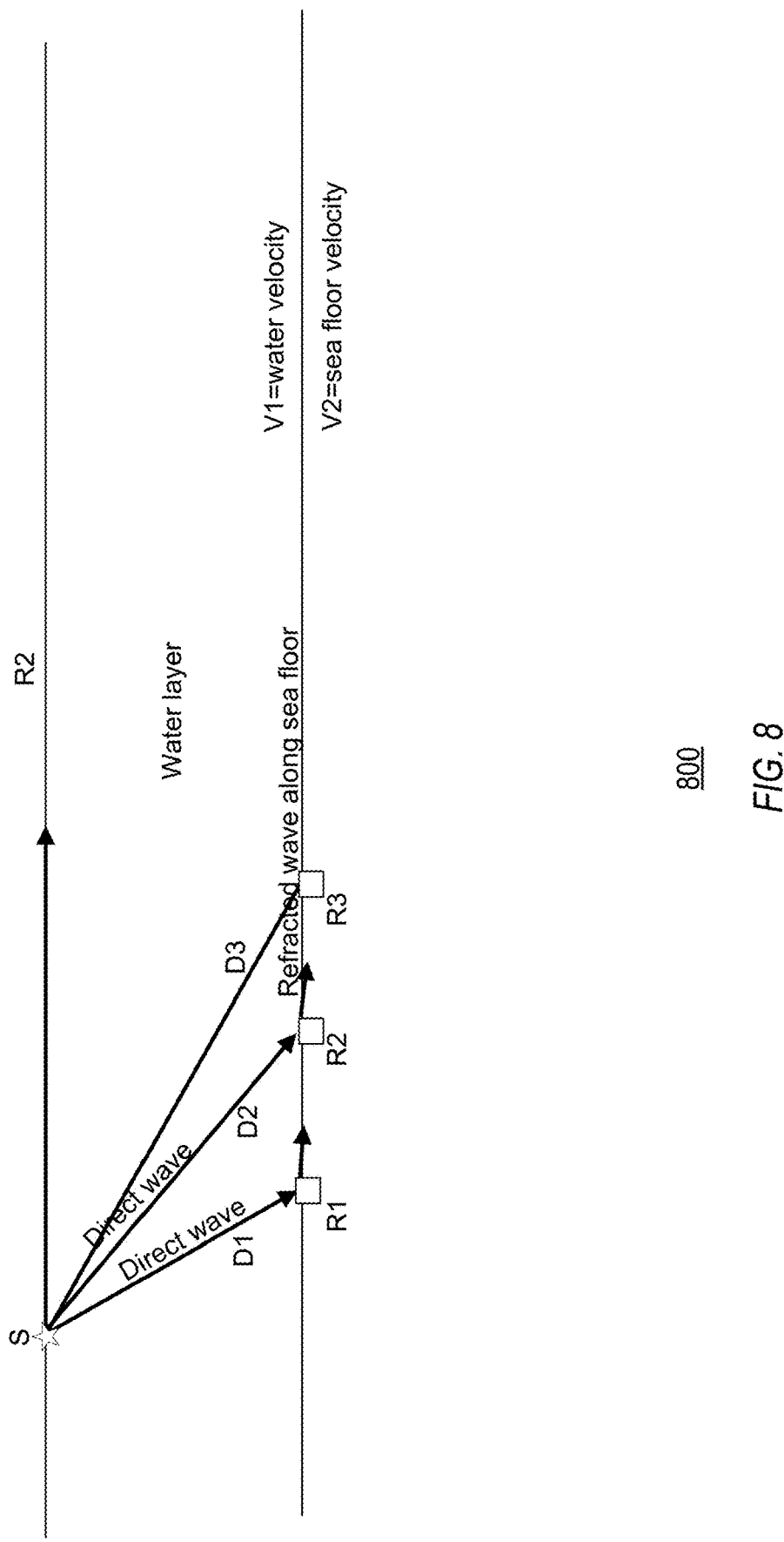
FIG. 8 depicts an illustration of data recording according to an exemplary embodiment.

FIG. 8 depicts an illustration of data recording 800 according to an exemplary embodiment. FIG. 8 may reference the same or similar components of system 100, system 200 of FIG. 2, system 300 of FIG. 3, system 400 of FIG. 4, method of FIG. 5, device 600 of FIG. 6, and data recording 700 of FIG. 7. As illustrated in FIG. 8, waves may be recorded by receivers in the OBN devices. For example, direct waves and refracted waves may be recorded by the OBN receivers if the location of the object crash is within the seismic survey area. As denoted in FIG. 8, S represents the assumed location of the source. For OBN receivers, the distances SRi (i representing the receiver index) from pseudo-source location S to receivers Ri, such as R1 and R3, must be calculated. Sea floor velocity V2 must be greater than water velocity V1 for generation of a refracted event. In this manner, one or more direct waves and one or more refracted waves may be recorded by one or more ocean bottom node (OBN) devices. The refracted wave may be along the sea floor.

FIG. 9 depicts a graph 900 according to an exemplary embodiment. FIG. 9 may reference the same or similar components of system 100, system 200 of FIG. 2, system 300 of FIG. 3, system 400 of FIG. 4, method of FIG. 5, device 600 of FIG. 6, data recording 700 of FIG. 7, and data recording 800 of FIG. 8. An example of velocity analysis is illustrated in FIG. 9. For example, water velocity analysis may based on measuring the semblance on common midpoint (CMP) gathers that normal moveout (NMO) corrected with different velocities. Other methods may be used to estimate velocity in water or sediments, including but not limited to full wavefield inversion (FWI) and tomography.

FIG. 10 depicts a method 1000 of object location according to an exemplary embodiment. FIG. 10 may reference the same or similar components of system 100, system 200 of FIG. 2, system 300 of FIG. 3, system 400 of FIG. 4, method of FIG. 5, device 600 of FIG. 6, data recording 700 of FIG. 7, data recording 800 of FIG. 8, and graph 900 of FIG. 9. As illustrated in FIG. 10, an illustration of a triangulation method 1000 may be used to estimate the location of the crash. In some examples, the triangulation method 1000 utilized herein may be used to identify the epicenters of the earthquakes using measurements from a plurality of stations, such as three seismic stations as illustrated in FIG. 10. Based on the estimated source-receiver distances, SRi with i as index, circles with radii SRi corresponding to a minimum of three receivers may be drawn and their intersection may provide the potential location of the plane crash. As denoted, PL refers to the potential location of the crash determined from surface seismic data. Vi, with i representing the index, represents the location of receiver. For example, V1 is the location of the receiver for a first vessel with radius SR1, V2 is the location of the receiver for a second vessel with radius SR2, and V3 is the location of the receiver for a third vessel with radius SR3. Each of the receivers may be of the same type or a different type as the other receivers.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A location system, comprising:
   a memory; and
   a processor, wherein the processor is configured to:
   collect seismic data and geophysical data to determine object location,
   determine one or more seismic attributes associated with a plurality of noises based on the seismic data and the geophysical data using one or more machine learning algorithms,
   eliminate noises from the plurality of noises based on the one or more seismic attributes to provide a determined noise wherein the eliminated noises comprise noises inconsistent with the collected seismic data and geophysical data,
   predict the object location by comparing the collected seismic data and geophysical data with the determined noise, and
   validate the object location with image data.

2. The location system of claim 1, wherein the object location is associated with an object falling from the sky into a body of water.

3. The location system of claim 1, wherein the processor is further configured to eliminate noises that exceed a threshold depth.

4. The location system of claim 1, wherein the processor is further configured to compare data from a plurality of vessels.

5. The location system of claim 1, wherein the processor is further configured to determine an anomaly based on a measured amplitude over a non-zero time interval.

6. The location system of claim 1, wherein the image data is associated with an object falling from the sky into a body of water.

7. The location system of claim 1, wherein the processor is further configured to receive the seismic data from a first survey and a second survey.

8. The location system of claim 7, wherein the first survey comprises a streamer survey, and the second survey comprises an ocean bottom node survey.

9. The location system of claim 1, wherein the processor is further configured to receive one or more measurements from a plurality of fiber optic cables deployed on an ocean floor.

10. The location system of claim 1, wherein the processor is further configured to derive an affirmative disposition based on whether an anomalous noise is consistent with a different measurement retrieved from one or more surveys.

11. A method of determining object location, comprising:
    collecting, by a processor, seismic data and geophysical data to determine object location;
    determining, by the processor, one or more seismic attributes associated with a plurality of noises based on the seismic data and the geophysical data using one or more machine learning algorithms;
    eliminating, by the processor, noises from the plurality of noises based on the one or more seismic attributes to provide a determined noise wherein the eliminated noises comprise noises inconsistent with the collected seismic data and geophysical data;
    predicting, by the processor, the object location by comparing the collected seismic data and the geophysical data with the determined noise; and
    validating, by the processor, the object location by with image data.

12. The method of claim 11, wherein the object location is associated with an object falling from the sky into a body of water.

13. The method of claim 11, further comprising eliminating, by the processor, the noises that exceed a threshold depth.

14. The method of claim 11, further comprising comparing, by the processor, data from a plurality of vessels.

15. The method of claim 11, further comprising determining, by the processor, an anomaly based on a measured amplitude over a non-zero time interval.

16. The method of claim 11, wherein the image data is associated with an object falling from the sky into a body of water.

17. The method of claim 11, further comprising receiving, by the processor, the seismic data from a first survey and a second survey.

18. The method of claim 17, wherein the first survey comprises a streamer survey, and the second survey comprises an ocean bottom node survey.

19. The method of claim 11, further comprising receiving, by the processor, one or more measurements from a plurality of fiber optic cables deployed on an ocean floor.

20. A computer readable non-transitory medium comprising computer executable instructions that, when executed on a processor, perform procedures comprising the steps of:
    collecting seismic data and geophysical data to determine object location;
    determining one or more seismic attributes associated with a plurality of noises based on the seismic data and the geophysical data using one or more machine learning algorithms;
    eliminating noises from the plurality of noises based on the one or more seismic attributes to provide a determined noise wherein the eliminated noises comprise noises inconsistent with the collected seismic data and geophysical data;
    predicting the object location by comparing the collected seismic data and geophysical data with the determined noise; and
    validating the object location with image data.

* * * * *